United States Patent [19]

Li

[11] Patent Number: 5,707,131
[45] Date of Patent: Jan. 13, 1998

[54] COLLECTIONS AND CONDENSING OPTICAL SYSTEM USING CASCADED CONCAVE REFLECTORS

[75] Inventor: Kenneth Li, Arcadia, Calif.

[73] Assignee: Cogent Light Technologies, Inc., Santa Clarita, Calif.

[21] Appl. No.: 590,930

[22] Filed: Jan. 24, 1996

[51] Int. Cl.[6] ............................................. F21V 7/00
[52] U.S. Cl. ............................ 362/32; 362/241; 362/297
[58] Field of Search .......................... 362/32, 241, 247, 362/297, 346

[56] References Cited

U.S. PATENT DOCUMENTS

| | | | |
|---|---|---|---|
| 4,757,431 | 7/1988 | Cross et al. | 362/261 |
| 5,414,600 | 5/1995 | Strobl et al. | 362/346 |
| 5,491,620 | 2/1996 | Winston et al. | 362/32 |
| 5,560,699 | 10/1996 | Davenport et al. | 362/346 |

FOREIGN PATENT DOCUMENTS 612956  8/1994  European Pat. Off. ............... 362/32

*Primary Examiner*—Ira S. Lazarus
*Assistant Examiner*—Sara Sachie Raab
*Attorney, Agent, or Firm*—Rothwell, Figg, Ernst & Kurz

[57] ABSTRACT

An electromagnetic radiation collecting and condensing optical system includes a number of cascaded concave reflectors and a number of electromagnetic radiation or light sources which radiate light energy onto the concave reflectors in such manner that the energy from each source is combined by the reflectors into a single output which is used to illuminate a target, such as a single core optical fiber.

15 Claims, 4 Drawing Sheets

COLLECTIONS AND CONDENSING OPTICAL SYSTEM USING CASCADED CONCAVE REFLECTORS

BACKGROUND OF THE INVENTION

1. Field of the Invention

This invention relates generally to illumination systems and more particularly relates to optical systems for collecting and condensing electromagnetic radiation in the visible spectrum down to a very small spot size for coupling to a target.

2. Description of the Related Art

A prior art optical system for collecting and condensing visible electromagnetic radiation is described in U.S. Pat. No. 4,757,431, issued on Jul. 12, 1988, incorporated by reference herein in its entirety.

FIGS. 1a and 1b illustrate the concept described in the '431 patent. The system consists of three main components: a source, a reflector, and a target.

(1) Source (S). The source is typically a point source of electromagnetic radiation, such as a compact mercury arc lamp. In the present invention, the source is preferably a high intensity xenon arc lamp; however, any compact source of electromagnetic radiation with small area of emission would be suitable.

(2) Reflector (M). The reflector focuses electromagnetic radiation from the source S to the target I. In the '431 patent, this reflector is a spherically shaped mirror having a concave surface facing the source and target. According to the present invention, the reflector is preferably toroidally or ellipsoidally shaped for improved performance characteristics over the spherical mirror.

(3) Target (I). The target is a small object which is to be provided with illumination having the highest density of electromagnetic radiation possible. According to the invention, the target I is a single core optical fiber with a diameter ranging from 0.1 mm to 1.0 mm.

As shown in FIGS. 1a and 1b, the reflector M has a radius of curvature r with an optical axis Z and a center of curvature O defining the origin of an (x,y,z) coordinate system. The reflector has an aperture of diameter A placed symmetrically about the optical axis z.

The source S is positioned at a distance $y_0$ ( at coordinates $0, y_0, 0$ in the x,y,z coordinate system) from the optical axis Z. Light radiation from the source S is collected by the reflector M and is reflected to converge at a point $(0, -y_0, 0)$ on the opposite side of the optical axis, in the same plane as the source. It is at this point that the target I (i.e., a single core optical fiber) is placed to receive the radiation which has been collected and condensed by the concave reflector down to a very small area. The radiation is then carried by the optical fiber to an output end of the fiber where the condensed high intensity light can be used for a variety of applications. Merely one example of the use of such a high intensity light would be in the field of endoscopy and endoscopic surgery.

One shortcoming in the conventional off-axis concave collecting and condensing optical system is that the intensity of the output light beam is limited by the brightness of the arc lamp. Another disadvantage is that the burning out of the lamp would result in the interruption of a surgical procedure while the lamp is changed. The present invention provides significant improvements to the conventional optical system which overcome these disadvantages.

SUMMARY OF THE INVENTION

The present invention provides an optical system in which a plurality of sources and reflectors are provided in a cascading relationship, in such manner that the brightness of the sources is combined together to be inputted to a target, such as a single core optical fiber.

The resulting brightness at the target will be higher than the case with a single source, and is limited only by the number of sources and reflectors placed in cascade in the particular configuration. The invention also can be configured for two outputs instead of only one output. With two or more sources in cascade, intensity control can be carried out by turning individual sources on and off. An additional feature of the invention is the redundancy provided by having multiple sources in cascade. In an application where light intensity of less than all sources is required, a replacement source can be turned on with virtually no downtime in the event of failure of any one source.

In particular, the present invention provides an electromagnetic radiation collecting and condensing optical system for providing a high intensity light output with a relatively high radiation flux in a small area, comprising a first concave reflector having an optical axis and a center of curvature, a first source of electromagnetic radiation located near the center curvature of said first concave reflector but offset by a first predetermined distance from said optical axis, a second source of electromagnetic radiation located at a second predetermined distance substantially equal to said first predetermined distance from said optical axis opposite said first source, a second concave reflector having an optical axis and a center of curvature, oriented such that said second source is located near its center of curvature but offset by a third predetermined distance from the optical axis of said second concave reflector, and a target placed near the center of curvature of said second concave reflector but offset from the optical axis of said second concave reflector by a fourth predetermined distance substantially equal to said third predetermined distance opposite said second source, to collect electromagnetic radiation reflected by said second concave reflector.

BRIEF DESCRIPTION OF THE DRAWINGS

The present invention will become more fully understood from the detailed description given hereinbelow and the accompanying drawings, which are given by way of illustration only and which are not limitative of the present invention, and wherein.

DETAILED DESCRIPTION OF THE PREFERRED EMBODIMENTS

Figure 1A:
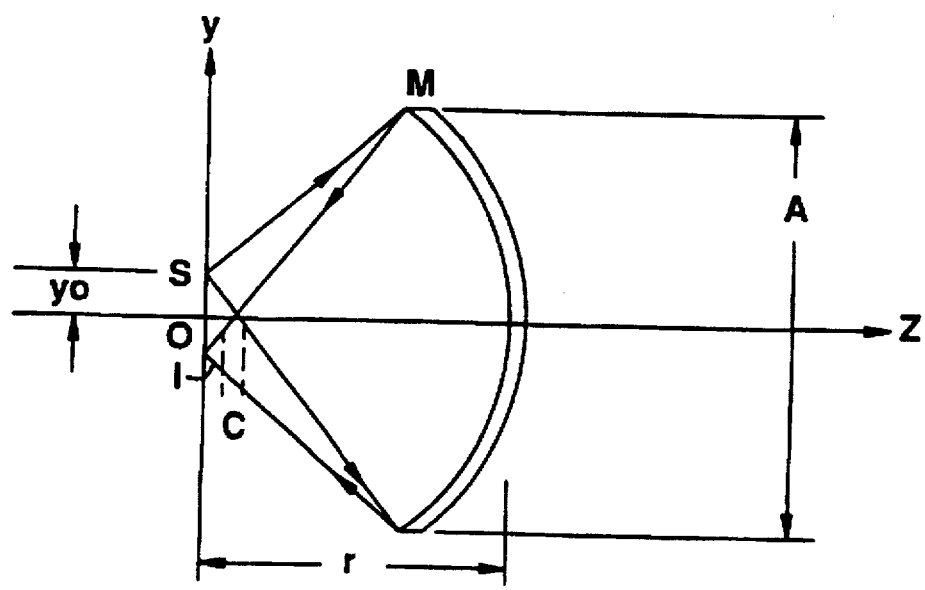
FIGS. 1a and 1b are schematic cross-sectional views of a conventional collecting and condensing optical system in the Y-Z and X-Z planes, respectively.
Figure 1B:
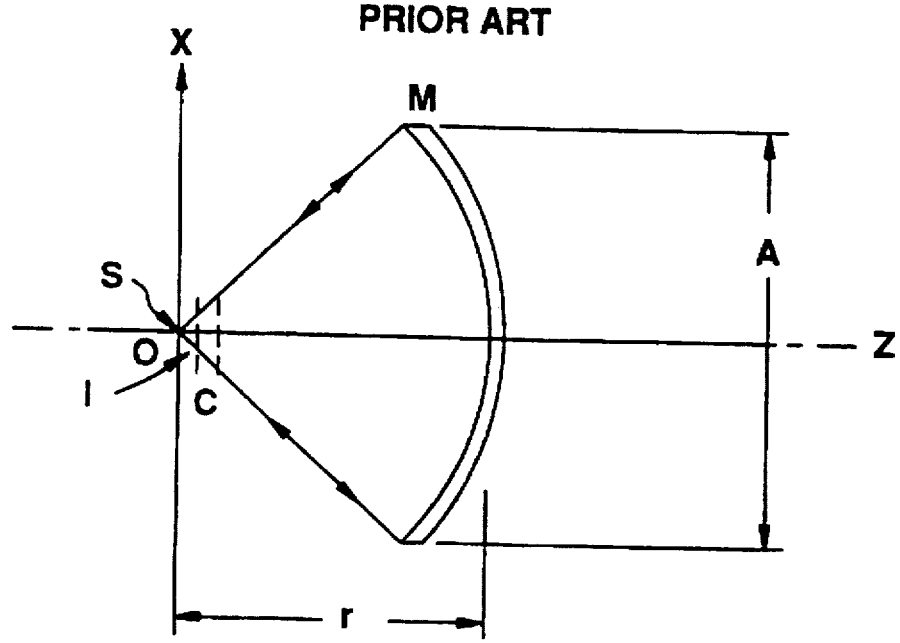
Figure 2:
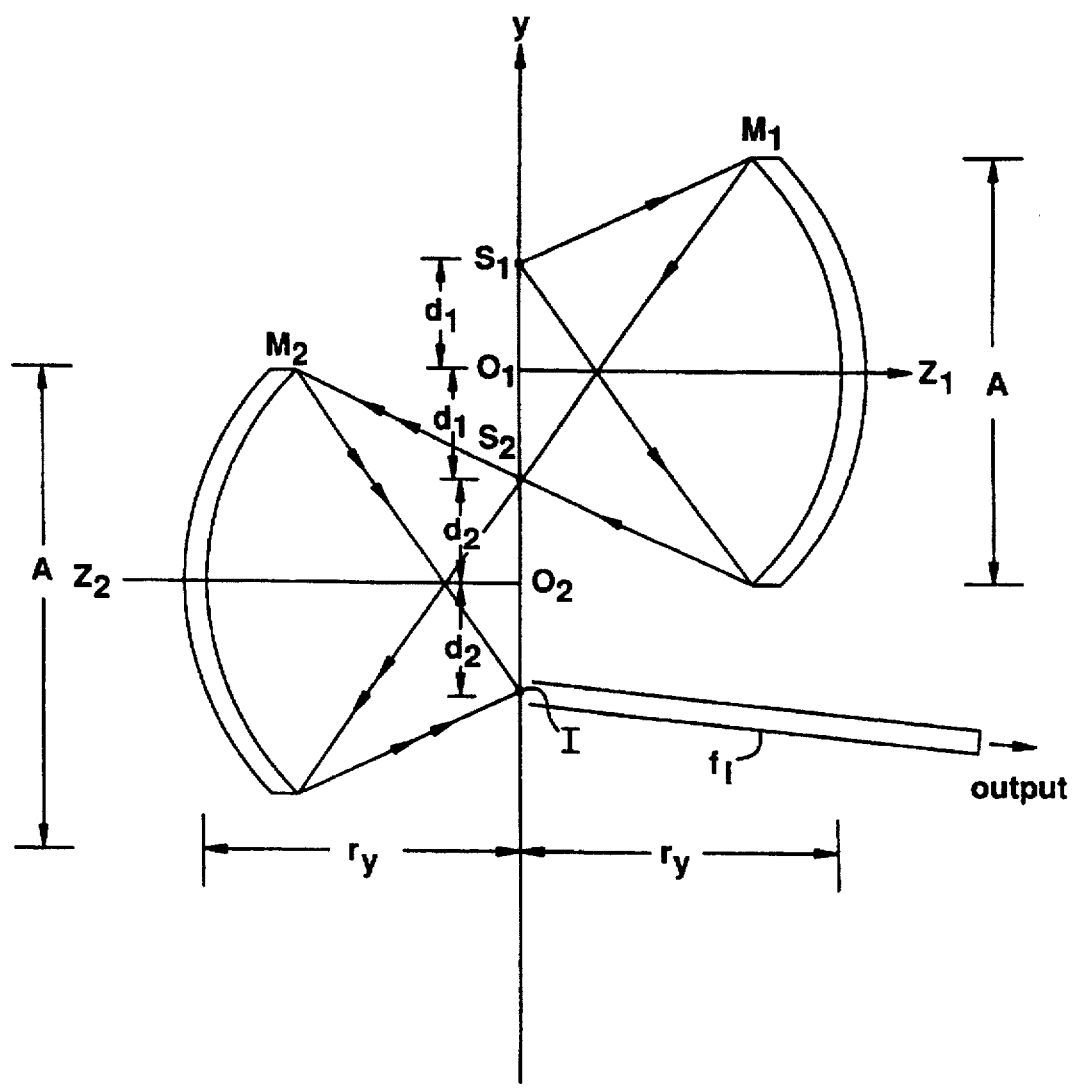
FIG. 2 is a schematic cross-sectional view in the Y-Z plane of a cascaded optical system according to one preferred embodiment of the present invention.
Figure 3:
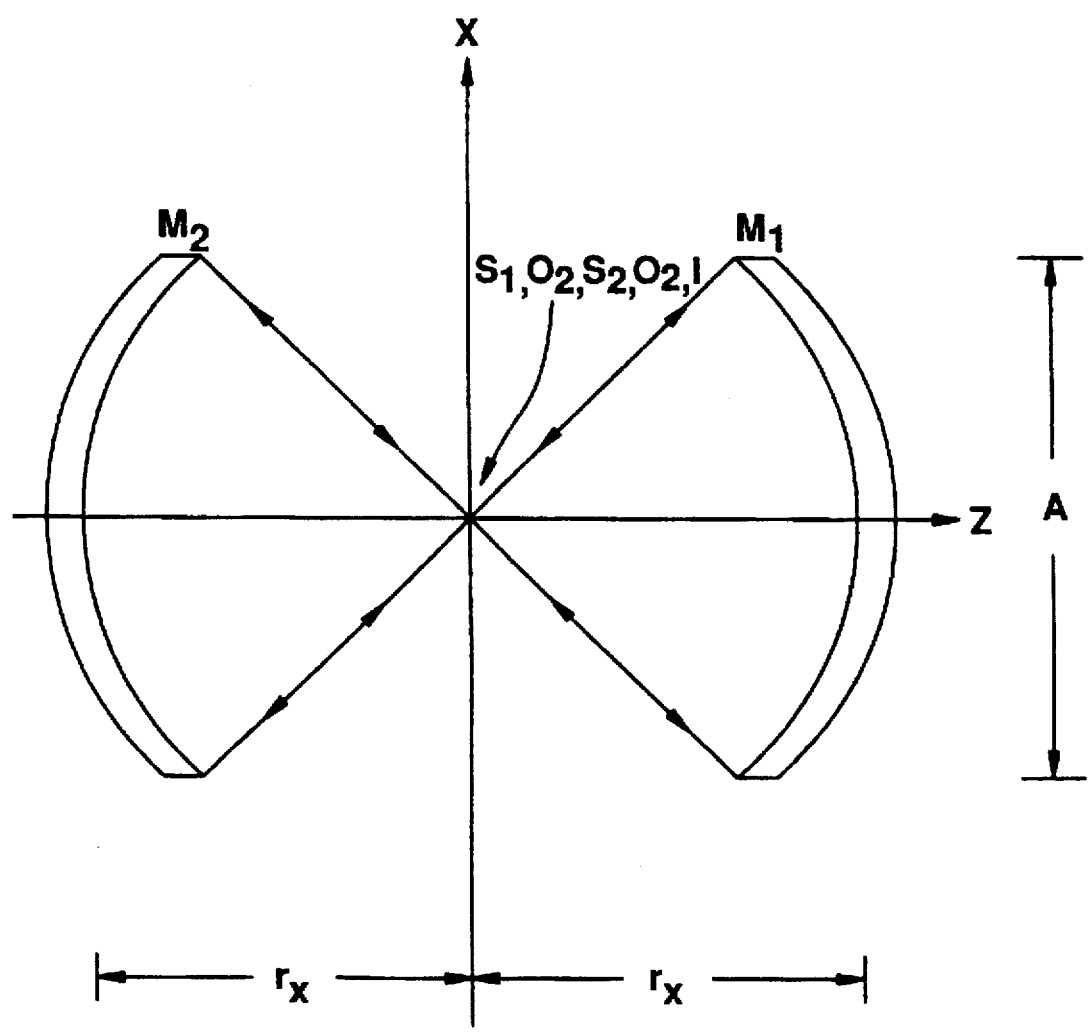
FIG. 3 is a schematic cross-sectional view of the system of FIG. 2 in the X-Z plane.

As shown in FIGS. 2 and 3, according to a first embodiment of the invention, there are provided two concave reflectors $M_1$ and $M_2$ each having a concave surface of aperture diameter A, with a radius of curvature $r_y$. The reflectors are preferably toroidal shaped, however, any concave surface could be used. Reflector $M_1$ has an optical axis $Z_1$ and a center of curvature $O_1$, and reflector $M_2$ has an optical axis $Z_2$ and a center of curvature $O_2$. The reflectors $M_1$ and $M_2$ are located on opposite sides of a common Y axis, with their respective centers of curvature $O_1$ and $O_2$ being located on the common Y axis.

A first source $S_1$, preferably a high intensity xenon arc lamp, is placed on the Y axis at a first distance $d_1$ from the center of curvature $O_1$ of reflector $M_1$. A second source $S_2$, also preferably a high intensity xenon arc lamp, is placed on the Y axis at distance $d_1$ from the opposite side of the center of curvature $O_1$ of reflector $M_1$.

Light radiation from source $S_1$ is collected and condensed by reflector $M_1$, and reflected to converge at a point an equal distance $d_1$ on the opposite side of the center of curvature $O_1$. According to the invention, source $S_2$ is placed at this point, such that the radiation being emitted from source $S_2$, as well as the condensed radiation of $S_1$ being reflected by reflector $M_1$, are irradiated onto the concave surface of reflector $M_2$. Reflector $M_2$ is positioned such that source $S_2$ is located a predetermined distance $d_2$ from its center of curvature $O_2$. See the '431 patent for a discussion of the optimization of the distances d.

Reflector $M_2$ thus receives the combined radiation of the source $S_2$ and the reflected radiation of source $S_1$ from reflector $M_1$. The radiation received by reflector $M_2$ is collected and condensed by the concave surface and reflected to form an image at point I, which is an equal and opposite distance from the center of curvature $O_2$ as the source $S_2$. In practice, the target to be illuminated, preferably a single core optical fiber ($f_1$ as shown in FIG. 2) of diameter from 0.1 mm to 1.0 mm, is placed at point I to receive the combined radiation from both sources.

Figure 4:
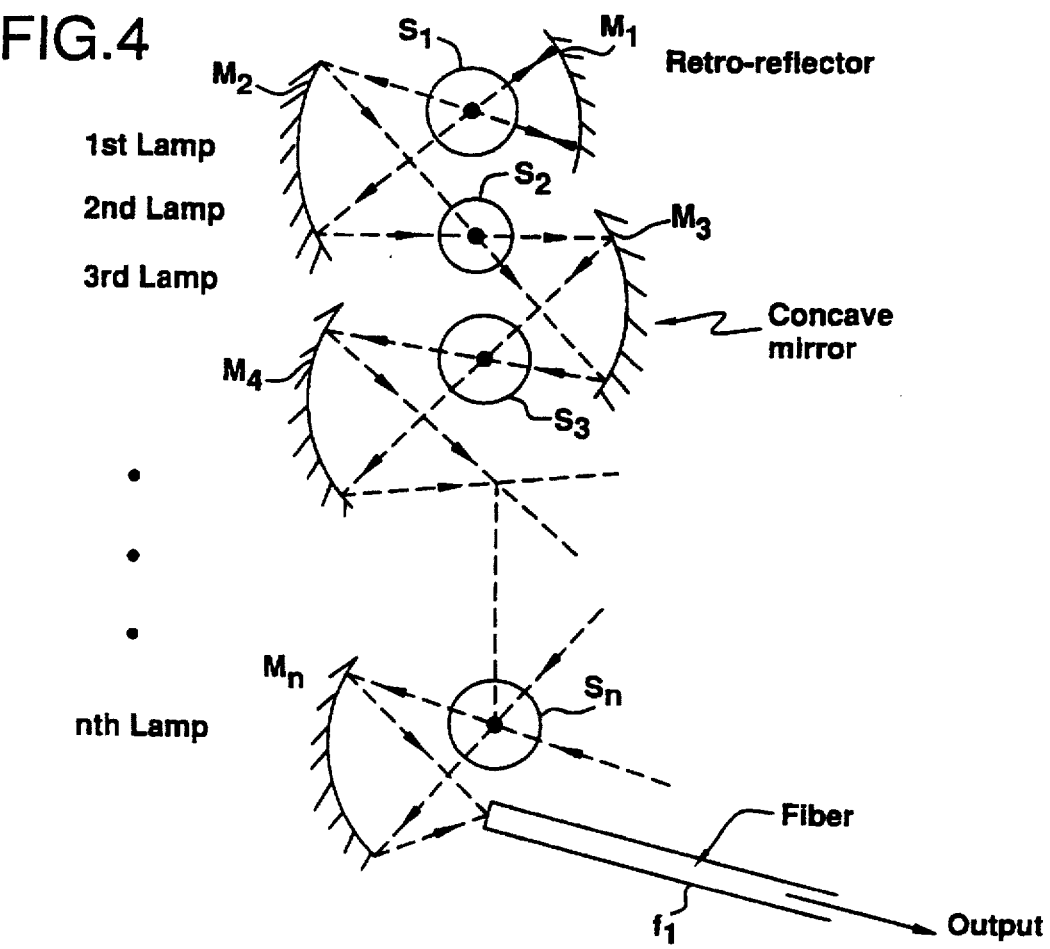
FIG. 4 is a schematic cross-sectional view of a cascaded optical system according to a second preferred embodiment of the present invention.

FIG. 4 illustrates a second preferred embodiment of the invention wherein a plurality of n sources $S_1$–$S_n$ are provided with n+1 reflectors $M_1$–$M_n$, where $M_1$ is a retroreflector with a target being placed at the reflected image point of the last reflector. This embodiment of the invention allows further increase in brightness of the output by adding the outputs of sources $S_1$–$S_n$ in a similar manner as described above for a 2-lamp-cascade system. Furthermore, intensity control to be effected merely by turning on and off individual sources to adjust the brightness of the output to the desired level. This feature in some applications could eliminate the need to use mechanical masking-type light attenuation devices to adjust light intensity.

Figure 5:
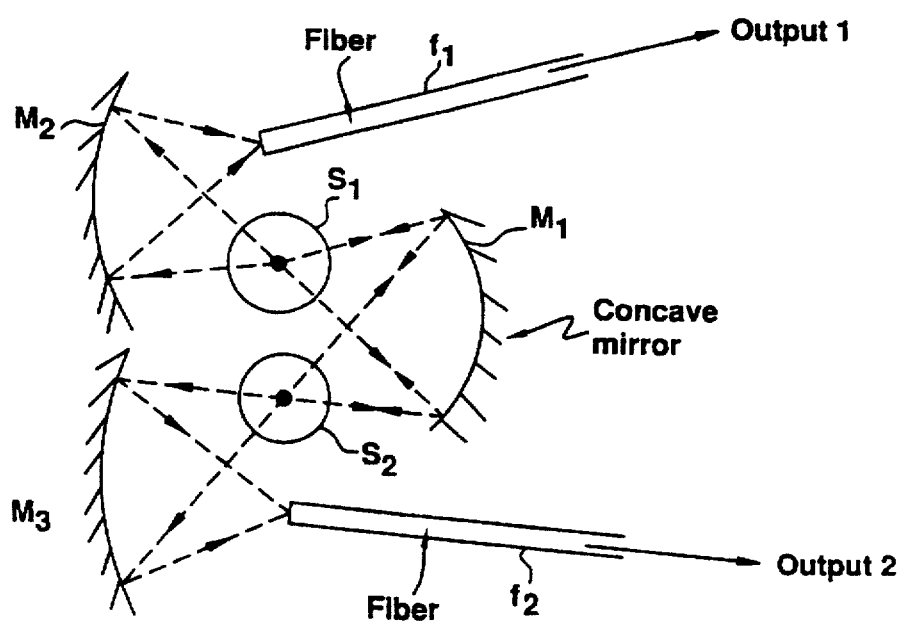
FIG. 5 is a schematic cross-sectional view of a cascaded optical system according to a third preferred embodiment of the present invention.

FIG. 5 shows yet another embodiment of the invention which provides for dual outputs. In this embodiment, n sources are provided in conjunction with n+1 reflectors. A first target optical fiber $f_1$ is provided at the reflected image point of reflector $M_2$, and a second target optical fiber $f_2$ is provided at the reflected image point of reflector $M_3$. Each of the final stage reflectors receives and reflects radiation from the combination of sources to an associated output target optical fiber.

The invention having been thus described, it will be apparent to those skilled in the art that the same may be varied and modified in many ways without departing from the spirit and scope of the invention. Any and all such modifications are intended to be included within the scope of the following claims.

What is claimed is:

1. An electromagnetic radiation collecting and condensing optical system for providing a high intensity light output with a relatively high radiation flux in a small area, comprising:

a first concave reflector having an optical axis and a center of curvature;

a first source of electromagnetic radiation located near the center of curvature of said first concave reflector but offset by a first predetermined distance from said optical axis;

a second source of electromagnetic radiation located at a second predetermined distance substantially equal to said first predetermined distance from said optical axis opposite said first source;

a second concave reflector having an optical axis and a center of curvature, oriented such that said second source is located near the center of curvature of said second concave reflector but offset by a third predetermined distance from the optical axis of said second concave reflector; and a target placed near the center of curvature of said second concave reflector but offset from the optical axis of said second concave reflector by a fourth predetermined distance substantially equal to said third predetermined distance opposite said second source, to collect electromagnetic radiation reflected by said second concave reflector.

2. The electromagnetic radiation collecting and condensing optical system according to claim 1, wherein said target is a single core optical fiber.

3. The electromagnetic radiation collecting and condensing optical system according to claim 1, wherein at least one of said first and second sources is a high intensity arc lamp.

4. The electromagnetic radiation collecting and condensing optical system according to claim 3, wherein said high intensity arc lamp is a xenon arc lamp.

5. The electromagnetic radiation collecting and condensing optical system according to claim 1, wherein at least one of said first and second concave reflectors is a toroidal mirror.

6. An electromagnetic radiation collecting and condensing optical system according to claim 1, wherein at least one of said first and second concave reflectors is an ellipsoidal mirror.

7. A cascaded electromagnetic radiation collecting and condensing optical system for providing a high intensity light output with a relatively high radiation flux in a small area, comprising:

a plurality of concave reflectors each having an optical axis and a center of curvature, and each receiving electromagnetic radiation from at least one source of electromagnetic radiation;

a plurality of sources of electromagnetic radiation each located near the centers of curvature of at least two of said plurality of concave reflectors but offset by a predetermined distance from each of the optical axes of said two concave reflectors; and at least one target placed near the center of curvature of one of said plurality of concave reflectors but offset from the optical axis of said one of said concave reflectors by a predetermined distance substantially equal to but opposite the predetermined offset distance of the source being located near the center of curvature of said one of said concave reflectors, to collect electromagnetic radiation reflected by said one of said concave reflectors.

8. The cascaded electromagnetic radiation collecting and condensing optical system according to claim 7, further comprising a second target placed near the center of curvature of a second one of said plurality of concave reflectors but offset from the optical axis of said second one of said concave reflectors by a predetermined distance substantially equal to but opposite the predetermined offset distance of the source being located near the center of curvature of said second one of said concave reflectors, to collect electromagnetic radiation reflected by said second one of said concave reflectors.

9. The cascaded electromagnetic radiation collecting and condensing optical system according to claim 7, wherein said target is a single core optical fiber.

10. The cascaded electromagnetic radiation collecting and condensing optical system according to claim 7, wherein at least one of said plurality of sources is a high intensity arc lamp.

11. The cascaded electromagnetic radiation collecting and condensing optical system according to claim 9, wherein said high intensity arc lamp is a xenon arc lamp.

12. The cascaded electromagnetic radiation collecting and condensing optical system according to claim 7, wherein at least one of said plurality of concave reflectors is a toroidal mirror.

13. The cascaded electromagnetic radiation collecting and condensing optical system according to claim 7, wherein at least one of said plurality of concave reflectors is an ellipsoidal mirror.

14. The cascaded electromagnetic radiation collecting and condensing optical system according to claim 7, wherein said plurality of concave reflectors comprises at least three reflectors.

15. The cascaded electromagnetic radiation collecting and condensing optical system according to claim 12, wherein said plurality of sources comprises at least three sources.

* * * * *

UNITED STATES PATENT AND TRADEMARK OFFICE
CERTIFICATE OF CORRECTION

PATENT NO. : 5,707,131
DATED : January 13, 1998
INVENTOR(S) : Kenneth Li

It is certified that error appears in the above-indentified patent and that said Letters Patent is hereby corrected as shown below:

On cover page, item [54] In the Title, "COLLECTIONS" should be -- COLLECTING --;
   Col. 1, line 1, in the Title, "COLLECTIONS" should be -- COLLECTING --;
<u>In the Claims:</u> Col. 4, line 37, "An" should be -- The --.

Signed and Sealed this

Sixteenth Day of June, 1998

Attest:

BRUCE LEHMAN

Attesting Officer

Commissioner of Patents and Trademarks